United States Patent
Graham et al.

(10) Patent No.: US 8,434,964 B2
(45) Date of Patent: May 7, 2013

(54) ELECTRICAL ISOLATOR FOR COUPLINGS

(75) Inventors: Nicholas Simon Graham, Greenville, SC (US); Ronald Ralph Cairo, Greer, SC (US); Thomas Joseph Farineau, Schoharie, NY (US); William Patrick Rusch, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 145 days.

(21) Appl. No.: 12/818,511

(22) Filed: Jun. 18, 2010

(65) Prior Publication Data
US 2011/0311304 A1 Dec. 22, 2011

(51) Int. Cl.
*F16D 1/02* (2006.01)

(52) U.S. Cl.
USPC ............................................. 403/337; 403/23

(58) Field of Classification Search ............ 403/23, 403/300, 335, 337, 408.1
See application file for complete search history.

(56) References Cited

U.S. PATENT DOCUMENTS

| | | | | |
|---|---|---|---|---|
| 2,653,834 A * | 9/1953 | Purkhiser | ......................... | 285/50 |
| 3,855,818 A * | 12/1974 | Hochreuter | ..................... | 464/33 |
| 4,083,639 A * | 4/1978 | Terry | ............................... | 403/16 |
| 4,406,467 A * | 9/1983 | Burger et al. | ................. | 277/614 |
| 4,407,602 A * | 10/1983 | Terry, Jr. | ........................ | 403/336 |
| 4,596,297 A * | 6/1986 | Skibinski | ...................... | 177/132 |
| 4,637,619 A * | 1/1987 | Stansberry | ..................... | 277/637 |
| 4,716,721 A * | 1/1988 | Pask et al. | ........................ | 60/796 |
| 4,776,600 A | 10/1988 | Kohn | | |
| 4,822,204 A * | 4/1989 | Lindenthal | .................... | 403/337 |
| 4,889,458 A | 12/1989 | Taylor | | |
| 4,913,060 A | 4/1990 | Sekine et al. | | |
| 5,466,105 A * | 11/1995 | McKay et al. | .................. | 411/84 |
| 5,651,629 A * | 7/1997 | Wall et al. | .......................... | 403/2 |
| 5,888,140 A | 3/1999 | Klingler et al. | | |
| 6,045,291 A | 4/2000 | Ruehle et al. | | |
| 6,200,223 B1 | 3/2001 | Martens | | |
| 6,402,159 B1 * | 6/2002 | Kohn | ............................. | 277/608 |
| 6,833,632 B2 * | 12/2004 | Becker et al. | ................... | 290/55 |
| 6,869,081 B1 * | 3/2005 | Jenco | ............................. | 277/611 |
| 6,883,604 B2 | 4/2005 | Mack et al. | | |
| 7,530,757 B2 * | 5/2009 | Toda et al. | ....................... | 403/23 |
| 7,645,087 B1 | 1/2010 | Lin | | |
| 7,959,168 B2 | 6/2011 | Kiselis et al. | | |
| 2002/0117908 A1* | 8/2002 | Sanchez et al. | ................. | 310/51 |
| 2004/0217764 A1* | 11/2004 | Sasaoka | ....................... | 324/629 |
| 2010/0329867 A1* | 12/2010 | Patel et al. | ................ | 416/169 R |
| 2011/0311305 A1* | 12/2011 | Cairo et al. | ................... | 403/337 |

OTHER PUBLICATIONS

Final Office Action dated Aug. 3, 2012 for U.S. Appl. No. 12/818,486.
Non-final Office Action dated Feb. 7, 2012 for U.S. Appl. No. 12/818,486.

* cited by examiner

*Primary Examiner* — Joshua Kennedy
(74) *Attorney, Agent, or Firm* — Cantor Colburn LLP

(57) ABSTRACT

A coupling includes a first portion configured for connection to a first shaft and having a first portion flange and a second portion configured for connection to a second shaft and having a second portion flange. The coupling also includes an isolating member disposed between the first portion flange and the second portion flange and that is formed of ceramic and electrically isolates the first portion from the second portion. The coupling also includes one or more connecting members passing through the first portion flange, the second portion flange, and the isolating member and holding the first portion flange and the second portion flange in a fixed relationship to one another.

18 Claims, 5 Drawing Sheets

ELECTRICAL ISOLATOR FOR COUPLINGS

BACKGROUND OF THE INVENTION

The subject matter disclosed herein relates to couplings and, in particular, to electrical isolating rings in couplings.

Many applications require that rotating shafts be coupled together. For example, generators are driven by industrial turbines to produce electricity. A load coupling is often used to connect the shafts of the generator and the turbine. The coupling is typically electrically insulated to prevent current traveling down the rotor shafts. If current is transmitted to the rotor of the turbine, there is a possibility of electrical arcing from the rotor to the bearing surfaces, which can cause damage and potentially failure of the bearings.

In more detail, in one class of couplings for rotating shafts, a drive portion of the coupling is coupled to a driving shaft by a group of circumferentially spaced fasteners. A driven portion of such a coupling is similarly coupled to a driven shaft. The two parts of the coupling are then coupled together by connecting bolts. During rotation, the driving shaft applies a force that is transmitted through the connecting bolts to the driven shaft.

Typically, the drive portion is electrically isolated from the driven portion by a spacer ring disposed between the two. The prevailing approach to providing electrical isolation is through the use of a fiberglass reinforced epoxy (FG/Ep) insulating assembly. The insulating assembly typically includes four elements: an insulating plate, bushings, washers and a pilot ring.

BRIEF DESCRIPTION OF THE INVENTION

According to one aspect of the invention, a coupling includes a first portion configured for connection to a first shaft and having a first portion flange and a second portion configured for connection to a second shaft and having a second portion flange. The coupling of this aspect also includes an isolating member disposed between the first portion flange and the second portion flange, the isolating member being formed of ceramic and electrically isolating the first portion from the second portion and one or more connecting members passing through the first portion flange, the second portion flange, and the isolating member and holding the first portion flange and the second portion flange in a fixed relationship to one another.

According to another aspect of the invention, an transfer device includes a first portion having a first portion flange and a second portion having a second portion flange. The transfer device of this aspect also includes an isolating member disposed between the first portion flange and the second portion flange, the isolating member being formed of ceramic and electrically isolating the first portion from the second portion. The transfer device of this embodiment also includes a fastener passing through the isolating member, the first portion flange and the second portion flange and holding the first portion flange and the second portion flange in a fixed relationship to one another.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As described above, the prevailing approach to providing electrical isolation included fiberglass reinforced epoxy (FG/Ep) components. Although FG/Ep provides good isolation, experience and analysis have shown that FG/Ep may exhibit failure due to high stress (crushing of fiberglass). In addition, FG/Ep components may experience radial growth and deformation due to non-uniform properties (properties are dependent on direction of fiberglass reinforcement); may wear and degrade over time and have a low coefficient of friction (static=0.1) when in contact with steel which may result in low torque transmission through friction which can cause loading of connecting members in shear.

Accordingly, embodiments of the present invention may provide a more wear resistant and still electrically isolating material at the junction of a driving portion and a driven portion of a coupling. In particular, the material may be in form of an isolating member formed of ceramic.

In addition, embodiments of the present invention may include radial barriers to debris liberation in the event of a fracture in or damage to the isolating member. This may include providing recesses in one or both the drive and driven portions of the coupling. While the following description is directed to a load coupling, it shall be understood that the teachings herein may be applied to any coupling 100, for example a transmission joint that joins two rotating members and transfers energy, movement or the like.

Figure 1:
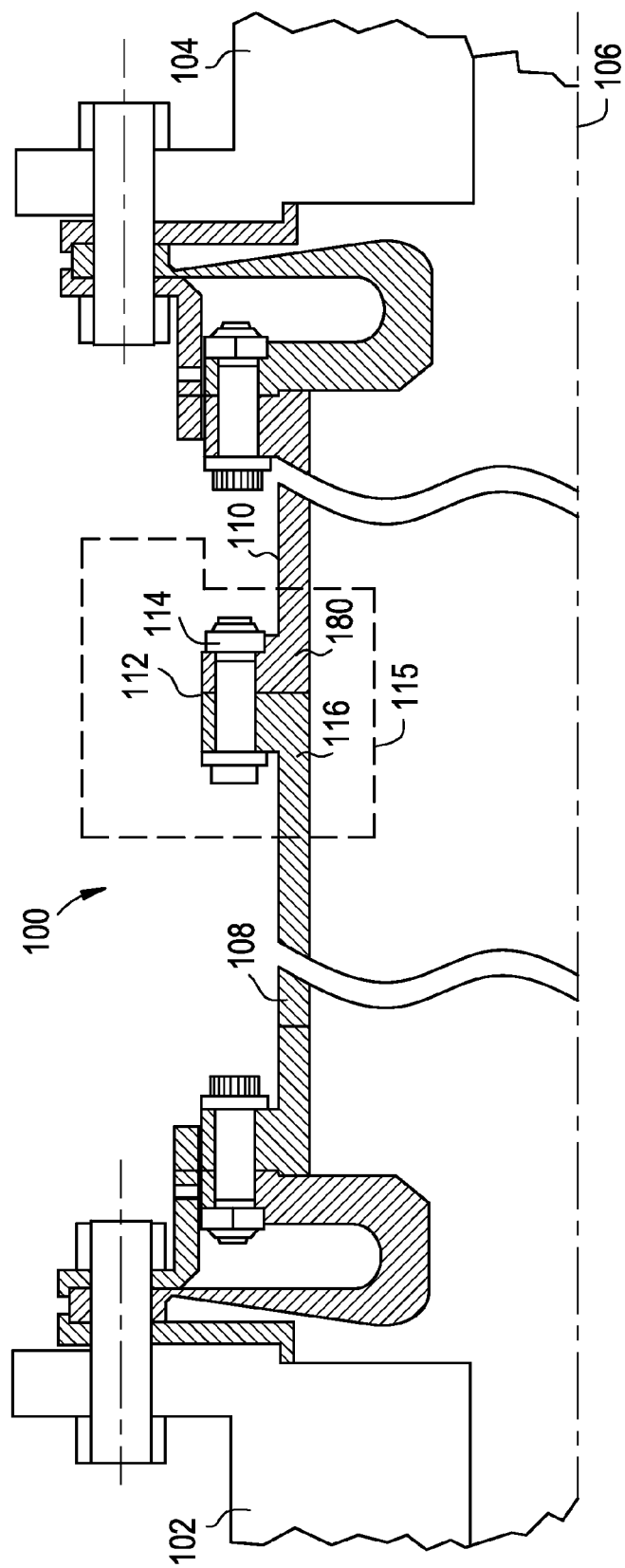
FIG. 1 is a side view of one half of a coupling according to one embodiment.

FIG. 1 is cross sectional view of one half of a coupling 100 according to one embodiment. The coupling 100 joins a first shaft 102 to a second shaft 104. In one embodiment, the coupling 100 is a flexible load coupling and may provide a load transfer in cases where the first shaft 102 and the second shaft 104 may become slightly off-axis from one another due to factors such as thermal expansion of the shafts. In operation, the coupling 100, the first shaft 102 and the second shaft 104 rotate generally around rotation axis 106.

The coupling 100 includes a first portion 108 coupled to the first shaft 102 and a second portion 110 coupled to the second shaft 104. The first portion 108 is coupled to the second portion 110 by one or more connection assemblies 115. Each connection assembly 115 includes a fastener 114 that holds a flange 116 of the first portion 108 to a flange 118 of the second portion 110.

In one embodiment, the first portion 108 is electrically isolated from the second portion 110. In this manner, the first shaft 102 is electrically isolated from the second shaft 104. In one embodiment, one or more isolating members 112 are disposed between the first portion 108 and the second portion 110 to electrically isolate them. In operation, the isolating members 112 transmit torque between the first portion 108 and the second portion 110 in addition to electrically isolating them from each other. Accordingly, in one embodiment, the isolating members 112 are formed of a material that is relatively stiff. In one embodiment, the isolating member is a ring. The ring may be a continuous ring or may be comprised of multiple portions as described in greater detail below.

In one embodiment, the isolating member 112 is formed of a ceramic material The ceramics may include high compressive strength, direction independent properties, high wear resistance and higher coefficient of friction than FG/Ep (i.e., static coefficient friction greater than or equal to about 0.22). The higher coefficient of friction may result in increased torque transmission through friction which can prevent loading of connecting members in shear. For example, the isolating members 112 may be formed at least one of Alumina ($Al_2O_3$), Alumina-Silica, Alumina-Carbon-SiC, Alumina-Chromium oxide, Alumina-Calcium oxide, cordierite ($2MgO\text{-}2Al_2O_3\text{-}5SiO_2$), Mullite ($Al_6Si_2O_{13}$), Silicon carbide (SiC), Silicon nitride ($Si_3N_4$), Zirconia ($ZrO_2$), Zirconium-Silicate ($ZrSiO_4$) and Zirconia strengthened aluminas ($ZrO_2$—$Y_2O_3$, $Al_2O_3$—$ZrO_2$, $ZrO_2$—$MgO$, $ZrO_2$—$Y_2O_3$—$CeO_2$) and combinations including at least one of the foregoing. Of course, other materials may be utilized.

One concern that may exist with utilizing ceramic materials as the isolating member 112 include the fact that ceramics may be brittle and prone to fast-fracture raising the threat of debris or large pieces being liberated. In the case of a turbine, the debris may become foreign object debris to the critical rotating components (airfoils) with the potential for catastrophic unit damage. In one embodiment, such issues may be addressed by providing projections from or recesses within either or both the first portion 108 and the second portion 110 that offer radial barriers to debris liberation.

Another concern with using ceramics in couplings is high tensile stresses, which can initiate and grow cracks. One embodiment may, therefore, include an isolating member 112 comprising a ring formed of segments with an improved geometry to reduce tensile stress in the circumferential or "hoop" direction. The segmented geometry may provide the following benefits over a continuous ring: it may create discrete boundaries as crack arrestors should over-stress and fast-fracture result; segments are cheaper and easier to manufacture while controlling critical features; segments may reduce bending stress during bolt tightening; segments represent reduced volumes of brittle material (such as ceramics) for which the strength is inversely proportional to the volume of material used (the probability of finding a critical flaw is statistically greater); segments allow for higher part quality due to the ability to control processing parameters and conditions and segments may reduce tangential tensile stress due to radial growth of flanges 116 and 118 at high speeds.

Further, while all of the options for ceramics described above, it may be beneficial to select a ceramic material with a similar modulus of elasticity to the flange material (steel). The elastic modulus is a measurement of the stiffness of the material. For instance, alumina has a higher elastic modulus than steel and is stiffer. Zirconia, on the other hand, has the same elastic modulus as steel and, therefore, is approximately the same stiffness. When spinning, the flange material grows radially outward. The high friction force from the clamping load provided by fastener 114 prevents the isolating member 112 from sliding against the steel flange. Thus, the isolating member 112 preferably is formed of a material that expands at the same rate as the material of the flange.

In FIG. 1, the connecting members 114 are shown as connecting the driving portion 108 and the driven portion 110 in a region outside an outer surface of both of these portions. Of course, the connecting members 114 may be located with the outer surface in one embodiment.

In the following description, the first portion 108 is referred to as a "driving" portion the second portion 110 is referred as a "driven" portion for the sake of convenience and clarity. It shall be understood that this is not meant as limiting and the first portion 108 could be referred to as a driven portion and the second portion 110 could be referred to as a driving portion.

Figure 2:
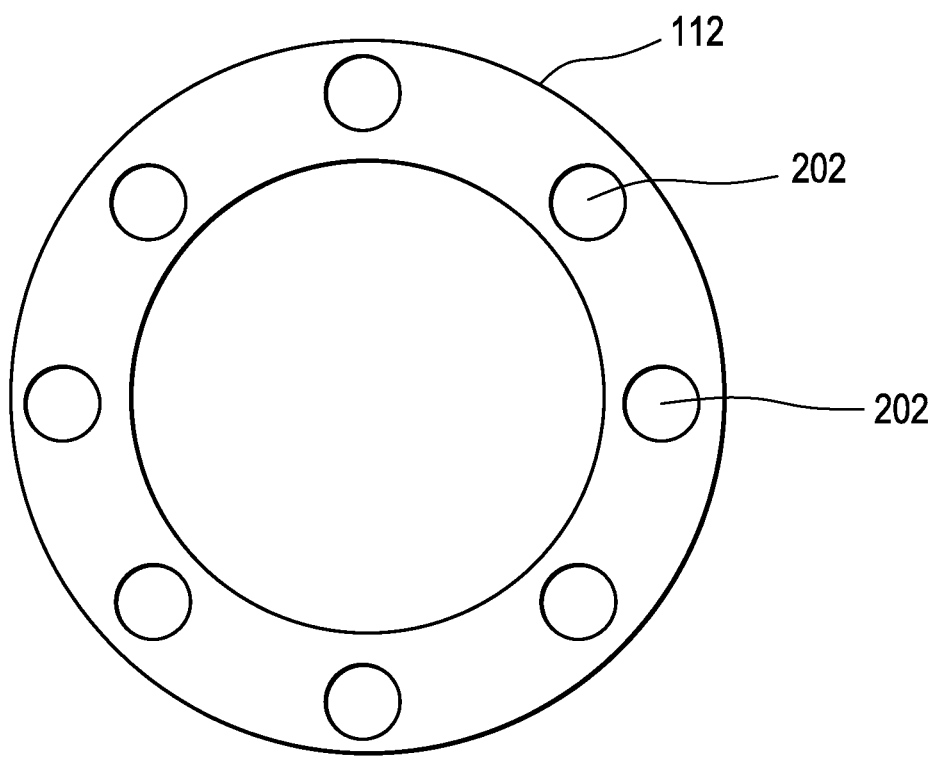
FIG. 2 shows an isolating member according to one embodiment.

FIG. 2 shows an example of an isolating member 112 according to one embodiment. The isolating member 112 includes one or more holes 202 to allow connecting members (not shown) to pass through. As shown, the isolating member 112 is formed as a continuous ring.

Figure 3:
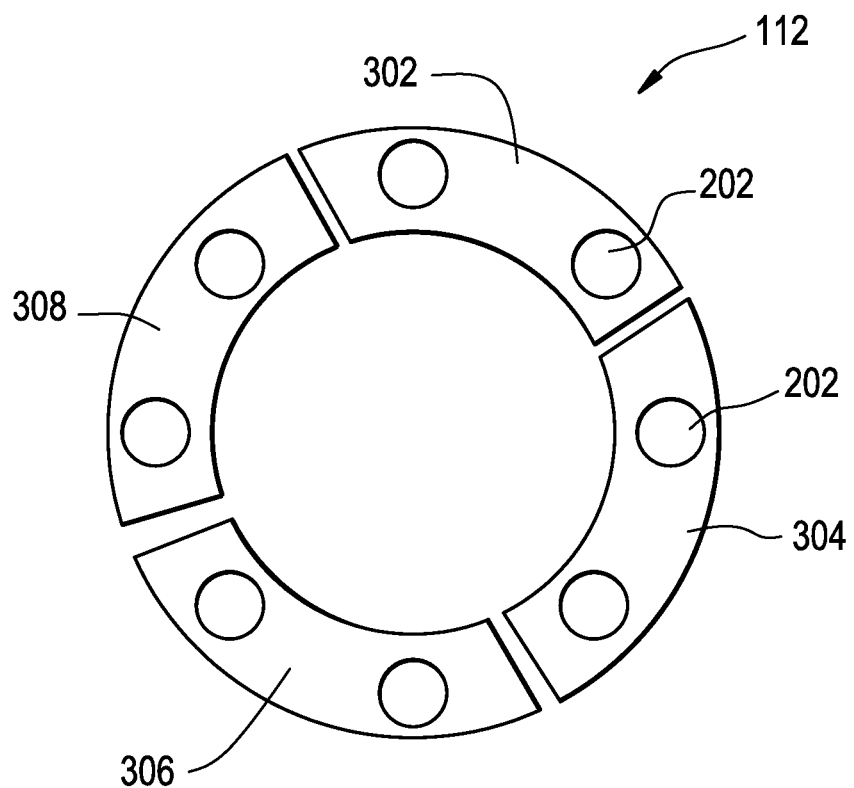
FIG. 3 shows a segmented isolating member according to another embodiment.

FIG. 3 shows an exploded view of an isolating member 112 formed of multiple segments. In particular, the isolating member 112 is segmented into a first segment 302, a second segment 304, a third segment 306, and fourth segment 308. In one embodiment, radially oriented edges of the segments 302, 304 and 306 may be beveled to allow the segments to overlap one another. The number of segments shown in FIG. 3 is illustrative only and not meant as limiting. Indeed, in one embodiment, the isolating member 112 may be formed of any number of segments equal to or less than the number of holes 202.

Figure 4:
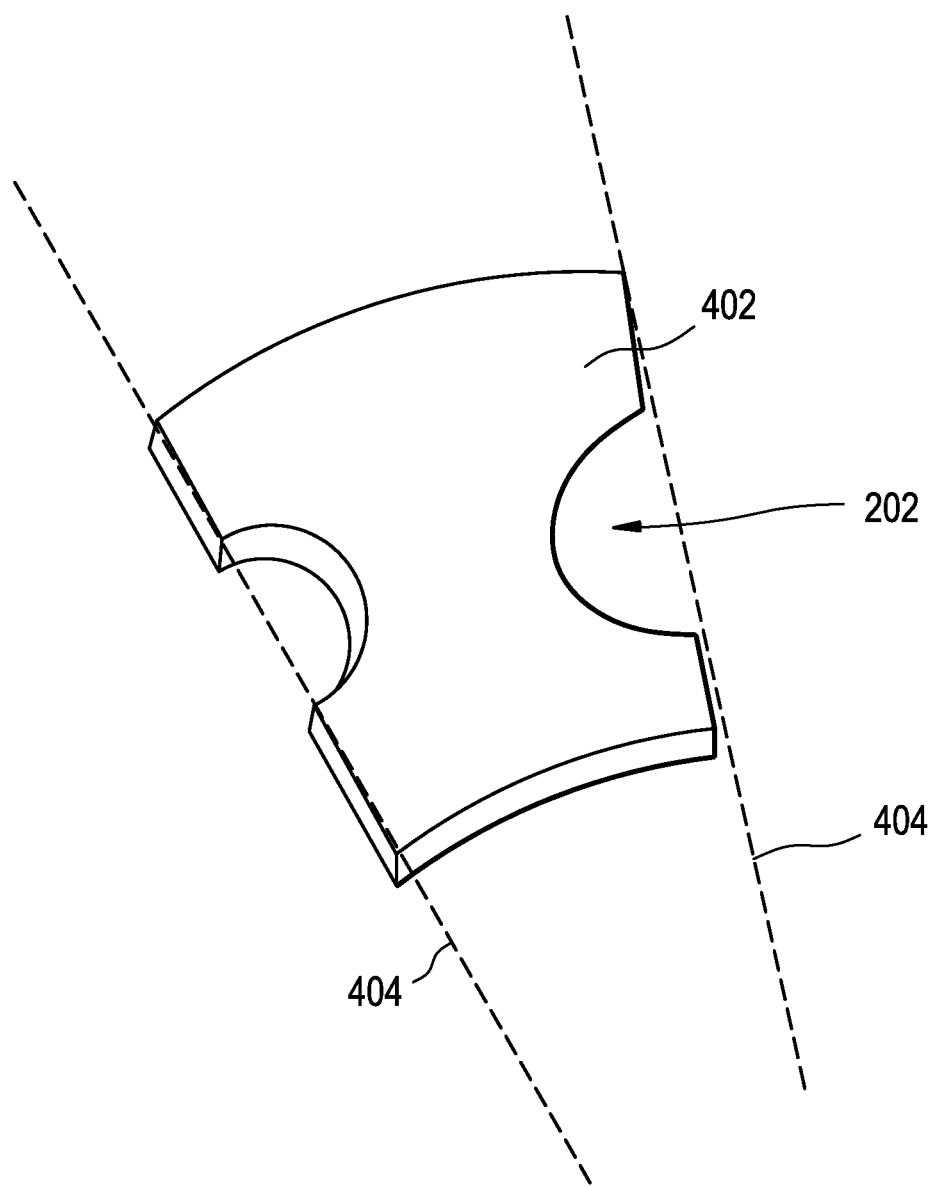
FIG. 4 shows an example of a split segment of an isolating member according to one embodiment.

FIG. 4 is a perspective view of a split segment 402 of an isolating member according to one embodiment. The split segment 402 is split along split lines 404 that each intersect a hole 202 in at least two locations. As shown, the split segment 402 is split at two adjacent holes 202. In one embodiment, the split lines 404 are radial centerlines emanating from a center point of a circular isolating member.

As discussed above, embodiments of the present invention may provide radial barriers formed by the driving portion or the driven portion to prevent or reduce debris liberation in the event that an isolating member cracks or otherwise fails. In particular, either or both of the driven portion or the driving portion may include projections from or recesses within that offer radial barriers to debris liberation.

Figure 5:
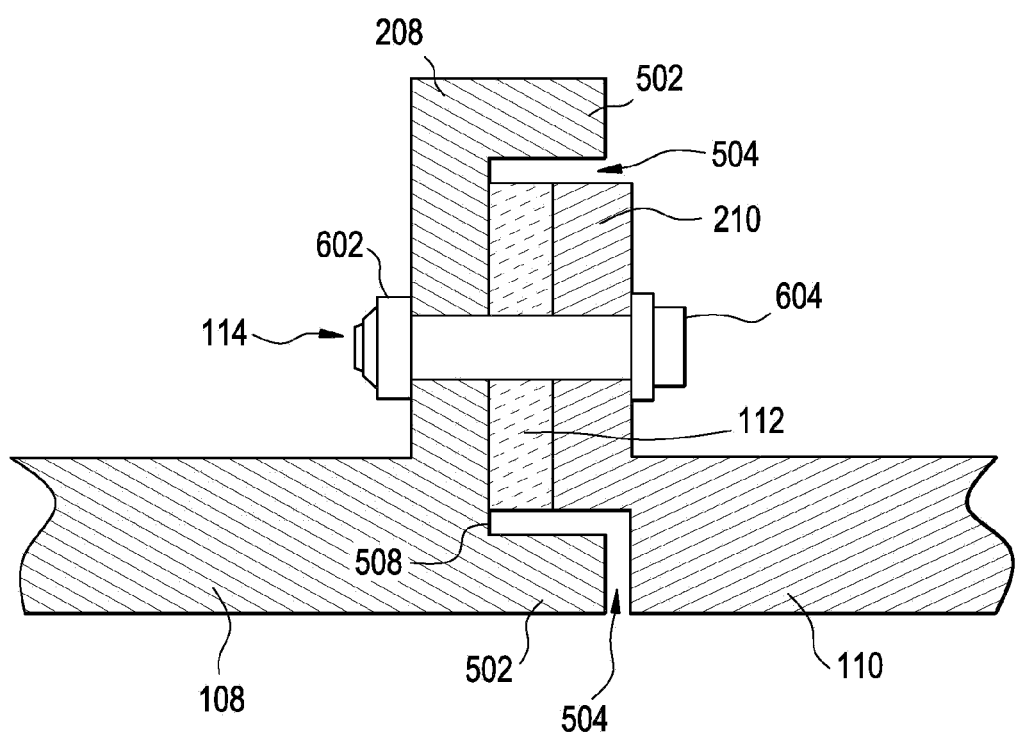
FIG. 5 is a side view of a connection assembly according to one embodiment.

FIG. 5 is a cut-away side view of a connection assembly 115 (FIG. 1) that provides radial barriers 502 to the debris that may be created in the event that the isolating member 112 breaks or is otherwise damaged. The isolating member 112 may be implemented, for example, as any of the embodiments shown in FIGS. 2-4.

The connection assembly 115 includes a driving flange 208 of the driving portion 108 and a driven flange 210 of the driven portion 110. In this example, the driven flange 210 is separated from the driving flange 208 by isolating member 112 and by an air gap 504. The air gap 504 may be sized to ensure that an expected current cannot arc across it and electrically couple the driving portion 108 to the driven portion 110.

In more detail, the driving flange 208 includes a first face 508. The radial barriers 502 extend beyond the first face 508 in the direction of the driven portion 110. In one embodiment, the radial barriers 502 surround the isolating member 112 and may be formed as the result of a groove being formed in the driving flange 210. In one embodiment, the width of the groove is greater than a width of the isolating member 112.

In FIG. 5, a connecting member 114 is implemented as a bolt having a head 602. The bolt 600 may be coupled to a nut 604 to hold the driving flange 208 in a fixed relationship to the driven flange 210. The combination of the bolt 600 and the nut 604 forming connecting member 114 in this embodiment provide a compressive force holding the driving flange 208 and the driven flange 210 in a fixed relationship to one another. Additionally, the connecting member 114 may transfer torque from the driving flange 208 to the driven flange 210 during operation.

Typically, the connecting member 114, the driving flange 208 and the driven flange 210 are all formed of a conducting metal such as steel. Accordingly, the isolating member 112 electrically isolates the driving flange 208 from the driven flange 210. Of course, other means may be required to isolate the connecting member 114 from the driving flange 208 and the driven flange 210. Otherwise, the connecting member 114 may provide an electrical connection between the driving flange 208 and the driven flange 210. One example includes washers and bushings formed of electrically insulating materials that electrically isolate the connecting members form the driving flange 208 and the driven flange 210.

FIG. 5 shows the radial barriers 502 as formed on the driving flange 208. Of course, in an alternative embodiment the radial barriers 502 could be formed on the driven flange 210.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A coupling comprising:
   a first portion configured for connection to a first shaft and having a first portion flange;
   a second portion configured for connection to a second shaft and having a second portion flange;
   an isolating member disposed between the first portion flange and the second portion flange, the isolating member being formed of ceramic and electrically isolating the first portion from the second portion; and
   one or more connecting members passing through the first portion flange, the second portion flange, and the isolating member and holding the first portion flange and the second portion flange in a fixed relationship to one another;
   wherein one of the first and second portions includes a radial barrier surrounding at least a portion of an outer radial side of the isolating member and wherein the isolating member extends radially outward beyond the connecting members.

2. The coupling of claim 1, wherein the isolating member is formed at least partially of alumina or zirconia.

3. The coupling of claim 1, wherein the first portion is a driving portion and the second portion is a driven portion.

4. The coupling of claim 1, wherein the first portion is a driven portion and the second portion is a driving portion.

5. The coupling of claim 1, wherein the first shaft is a turbine shaft and the second shaft is a generator shaft.

6. The coupling of claim 1, wherein the isolating member is a ring.

7. The coupling of claim 6, wherein the ring is formed of two or more separable portions.

8. The coupling of claim 6, wherein the ring includes two or more holes and is divided into two or more split segments formed by splitting the ring along lines passing through the two or more holes.

9. The coupling of claim 8, wherein each split segment extends between two holes.

10. The coupling of claim 1, wherein the first portion is separated from the second portion by an air gap.

11. The coupling of claim 1, wherein a recess in an outer surface of the second portion flange forms the radial barrier.

12. The coupling of claim 1, wherein a recess in an outer surface of the first portion flange forms the radial barrier.

13. The coupling of claim 1, wherein the isolating member is formed of at least one of: Alumina, Alumina-Silica, Alumina-Carbon-Silicon Carbide, Alumina-Chromium Oxide, Alumina-Calcium Oxide, Cordierite, Mullite, Silicon Carbide, Silicon Nitride, Zirconia, Zirconium-Silicate and a Zirconia strengthened Alumina and combinations including at least one of the foregoing.

14. An transfer device comprising:
   a first portion having a first portion flange;
   a second portion having a second portion flange;
   a monolithic ceramic isolating member disposed between the first portion flange and the second portion flange, the isolating member electrically isolating the first portion from the second portion; and
   a fastener passing through the monolithic ceramic isolating member, the first portion flange and the second portion flange and holding the first portion flange and the second portion flange in a fixed relationship to one another;
   wherein one of the first and second portions include a radial barrier surrounding at least a portion of an outer radial side of the isolating member and wherein the isolating member extends radially outward beyond the connecting members.

15. The transfer device of claim 14, wherein the isolating member is formed at least partially of alumina or zirconia.

16. The transfer device of claim 14, wherein the isolating member is ring.

17. The transfer device of claim 16, wherein the ring includes two or more holes and is divided into two or more split segments formed by splitting the ring along lines passing through the two or more holes.

18. The transfer device of claim 17, wherein each split segment extends between two holes.

* * * * *